United States Patent [19]
Kawasaki et al.

[11] Patent Number: 5,113,280
[45] Date of Patent: May 12, 1992

[54] METHOD FOR MOUNTING AND ADJUSTING A ROTATABLE OPTICAL ELEMENT POLYGON MIRROR OR THE LIKE TO A ROTATION SHAFT AND APPARATUS FOR SUCH METHOD

[75] Inventors: Keiichi Kawasaki, Tokyo; Kazuhisa Takahashi, Yokohama, both of Japan

[73] Assignee: Canon Kabushiki Kaisha, Tokyo, Japan

[21] Appl. No.: 670,737

[22] Filed: Mar. 18, 1991

Related U.S. Application Data

[60] Division of Ser. No. 423,582, Oct. 17, 1989, abandoned, which is a continuation of Ser. No. 138,044, Dec. 28, 1982, abandoned.

[30] Foreign Application Priority Data

Jan. 14, 1987 [JP] Japan ..................................... 62-6349

[51] Int. Cl.⁵ ............................................... G02B 26/10
[52] U.S. Cl. ..................................... 359/196; 359/216; 359/872
[58] Field of Search ............... 359/216, 217, 196, 212, 359/213, 221, 220, 819, 823, 223, 224, 871, 872; 356/138, 150, 151, 153

[56] References Cited

U.S. PATENT DOCUMENTS

| | | |
|---|---|---|
| 4,755,731 | 7/1988 | Anthony et al. ..................... 359/216 |
| 4,799,766 | 1/1989 | Estes ..................................... 359/823 |
| 4,961,627 | 10/1990 | Swain et al. ........................ 359/224 |

*Primary Examiner*—Loha Ben
*Attorney, Agent, or Firm*—Fitzpatrick, Cellla, Harper & Scinto

[57] ABSTRACT

An apparatus for adjusting the inclination of an optical element or the like is provided with a predetermined shaft, an optical element fitted to the predetermined shaft, a mounting seat for supporting the optical element, a keep member for holding and fixing the optical element between it and the mounting seat, and a spherical seat movable in a direction intersecting the predetermined shaft between the mounting seat and the optical element for adjusting the inclination of the optical element. A method for mounting and adjustng the optical element includes the steps of mounting the optical element on the spherical seat supported on the predetermined shaft, detecting an inclination angle of the optical element and shifting the spherical seat to adjust the optical element.

28 Claims, 5 Drawing Sheets

METHOD FOR MOUNTING AND ADJUSTING A ROTATABLE OPTICAL ELEMENT POLYGON MIRROR OR THE LIKE TO A ROTATION SHAFT AND APPARATUS FOR SUCH METHOD

This application is a division of application Ser. No. 423,582 filed Oct. 17, 1989, which is a continuation of application Ser. No. 138,044, filed Dec. 28, 1987, both abandoned.

BACKGROUND OF THE INVENTION

1. Field of the Invention

This invention relates to, an apparatus for adjusting the inclination of a rotatable optical member or the like, for example, an apparatus for and a method of adjusting the inclination of an optical element or the like which is suitable for a light beam scanning apparatus which effects reading or recording of images by the use of a light beam.

2. Related Background Art

As an example of the prior art, a plan view of a light beam scanning apparatus is shown in FIG. 7 of the accompanying drawings, and a cross-sectional view thereof is shown in FIG. 8 of the accompanying drawings. In these figures, the reference numeral 1 designates a well-known polygon mirror having the side surface thereof comprising a plurality of mirror surfaces 1a. The polygon mirror 1 is held by a mounting seat 2 which is placed above a base plate 3 in spaced apart relationship therewith. A rotary shaft 4 is journaled to the base plate 3, and the mounting seat 2 is slightly in contact with the rotary shaft 4. A plurality of surface fall adjusting screws 5 are threaded into the base plate 3 so as to contact the bottom surface of the mounting seat 2, and a fastening ring member 7 is coupled to the base plate 3 by means of bolts 6. A resilient ring 8 is interposed between the flange portion of the mounting seat 2 and the overlapping portion of the fastening ring member 7.

Rotation of the rotary shaft 4 causes rotation of the base plate 3 fixed to the rotary shaft 4, and the fastening ring member 7 coupled to the base plate 3 rotates following the rotation of the base plate. The rotation is transmitted to the mounting seat 2 by the friction thereof with respect to the fastening ring member 7 through the medium of the resilient ring 8 and thus, the polygon mirror 1 mounted on the mounting seat 2 is rotated.

Now, in the light beam scanning apparatus of this type, it is sometimes the case that the light beam scans a position deviated relative to a desired scanning position and the intervals between scanning lines which should be equal are disturbed. This leads to the problem that an image to be formed cannot be obtained accurately.

As a cause of this, there may be mentioned the surface fall of the mirror surfaces 1a of the polygon mirror 1 relative to the rotary shaft 4. This surface fall refers to the irregularity of each mirror surface 1a relative to a predetermined reference surface when the light beam emitted by a light beam generating device from a predetermined position is caused to scan a photosensitive member or the like by the reflection by the mirror surfaces 1a of the polygon mirror 1. If there is such surface fall, the position of the light beam which scans the photosensitive member differs from one mirror surface 1a to another and therefore, the intervals between scanning lines are disturbed and appear as pitch irregularity on the image.

The following may be mentioned as a primary cause of the surface fall. If the polygon mirror 1 is mounted on a rotative driving device while being inclined relative to the rotary shaft 4, the inclination of the next mirror surface 1a differs from a certain reference surface relative to the position of the scanning line scanned by the certain reference surface of the light beam entering from a predetermined position and therefore, the angle of reflection changes and the position of the scanning line differs. Accordingly, it is necessary to mount the polygon mirror 1 so that it is orthogonal to the rotary shaft 4, in other words, each mirror surface 1a is parallel to the rotary shaft 4. Actually, however, it is most difficult to mount the polygon mirror 1 on the rotary shaft 4 so that the former is orthogonal to the latter and so, it becomes necessary to adjust the mounting, i.e., to adjust the surface fall.

In the prior art, the level of the tip ends of the three adjustment screws 5 is adjusted to thereby adjust the inclination of the mounting seat 2 on which the polygon mirror 1 is mounted.

The reason why three adjustment screws 5 are used is that even if more than three screws are used, it is difficult to apply them to the mounting seat 2 with a uniform force.

However, the direction of inclination of the polygon mirror 1 relative to the rotary shaft 4 ranges over 360° and may assume any direction and therefore, it is very difficult to adjust the inclination by the use of only the three adjustment screws 5. Also, in in the prior art, consideration is given by using the resilient ring 8 so that no strain is produced in the mounting seat 2 and further in the polygon mirror 1. However, adjustment of the bolts 6 is also necessary to prevent a non-uniform load from being applied to such a resilient member.

In addition, the polygon mirror 1 bears chiefly the primary scanning in the light beam scanning and is rotated at a high speed and therefore, the resilient ring 8 is partly deformed or the positional deviation of the resilient ring 8 occurs due to the centrifugal force or the like during the high-speed rotation of the polygon mirror, and the adjusted surface becomes inclined again relative to the rotary shaft 4. Further, the resilient ring 8 has resiliency and therefore it may be expanded or contracted by the influence of a variation with time or heat or the like, and stable adjustment of the surface fall is difficult to maintain.

Particularly, under the requirement for images of high quality, it is said that if the intervals between scanning lines deviate about 0.2%, such deviation is visually recognized. If the intervals between scanning lines are 80–100 μm, the pitch irregularity of 0.2 μm will not be allowed, and the use of a readily deformable resilient member in the light beam scanning apparatus becomes a very unstable element with respect to the surface fall.

SUMMARY OF THE INVENTION

It is an object of the present invention to provide an apparatus which enables an optical element such as a polygon mirror to be mounted on a shaft such as a motor shaft with good accuracy.

It is also an object of the present invention to provide a method which can simply accomplish adjustment of the inclination of an optical element or the like relative to a predetermined shaft.

DESCRIPTION OF THE PREFERRED EMBODIMENTS

Embodiment 1

Figure 1:
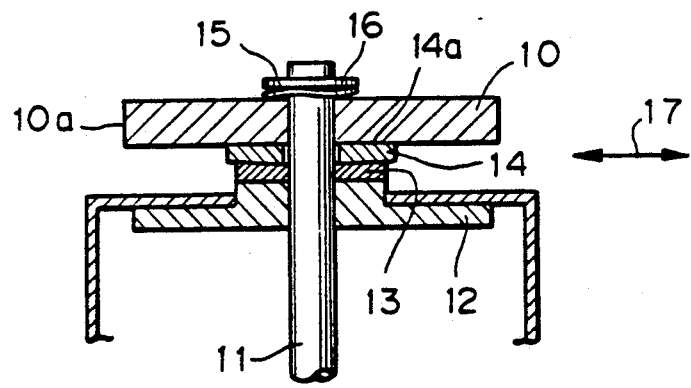
FIG. 1 shows an embodiment of the present invention.
Figure 2:
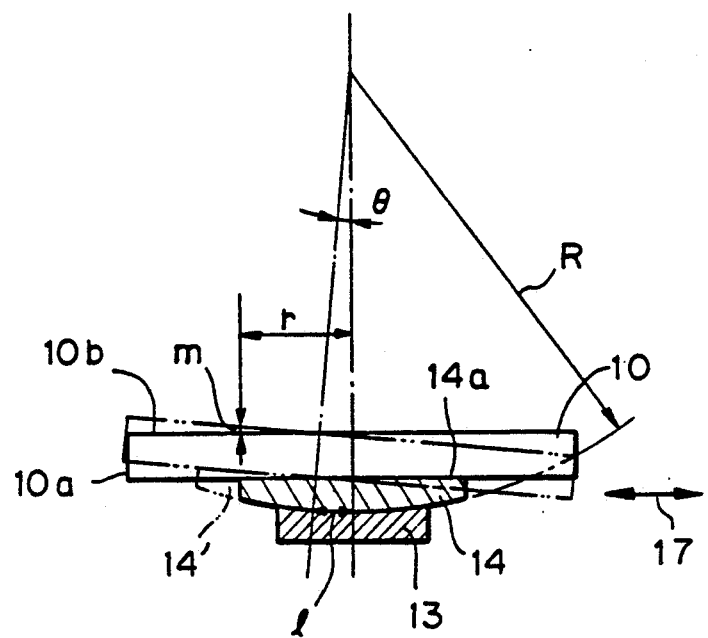
FIG. 2 illustrates the principle of the present invention.

FIG. 1 shows a first embodiment of the present invention, and FIG. 2 illustrates the principle thereof.

Referring to FIG. 1 which is a cross-sectional view, a mounting seat 12 is fixed to a rotary shaft 11. A mounting seat 13 having a receiving surface in the form of a concave surface is in intimate contact with the upper portion of the mounting seat 12, and the inside diameter of the mounting seat 13 is slightly in contact with the rotary shaft 11. A spherical seat 14 having a bottom surface in the form of a convex surface is in intimate contact with the upper portion of the mounting seat 13, and a gap for adjustment is provided between the inside diameter of the spherical seat 14 and the rotary shaft 11. A polygon mirror 10 is in intimate contact with the upper portion of the spherical seat 14 and is fitted to the rotary shaft 11.

The gap between the inside diameter of the spherical seat 14 and the rotary shaft 11 is large as compared with the gap between the inside diameter of the polygon mirror 10 and the rotary shaft 11. On top of the polygon mirror 10 having a plurality of mirror surfaces 10a, there are mounted a spring washer 15 and a fixing ring 16 to impart a predetermined intimate contact pressure to the polygon mirror 10, the spherical seat 14 and the mounting seats 13 and 12. As a spring member, a coil spring or the like may be used instead of the spring washer 15.

In a rotational polygon member of such a construction, to make adjustment so that the mirror surfaces 10a are parallel to the rotary shaft 11, the spherical seat 14 is slid in a direction perpendicular to the rotary shaft 11, i.e., the direction of arrow 17. Thereupon, the spherical seat 14 becomes inclined relative to the mounting seat 13, and the polygon mirror 10 which is in contact with the upper surface 14a of the spherical seat 14 can also be inclined and thus, the mirror surfaces 10a are adjusted.

The amount of adjustment will now be described with reference to FIG. 2.

When in FIG. 2, the radius of the mounting seat 13 and of the spherical seat 14 is R and the amount of slide when the spherical seat 14 is slid in the direction of arrow 17 is ( and the angle thereof is $\theta$, the following relation is established $$l = R\theta \qquad (1)$$

and if, for example, R = 100 mm, to incline the spherical seat 14 by $\theta = 15''$ from the center, it is seen from equation (1) that the spherical seat may be slid by $l = 7.27$ μm. Now, in the stage of adjustment, use is often made of a method of measuring the height of the upper surface 10b of the polygon mirror 10 by an electrostatic microsensor or a fiber sensor with said upper surface 10b as the reference surface for measurement, and measuring the inclination of the polygon mirror 10.

Figure 9:
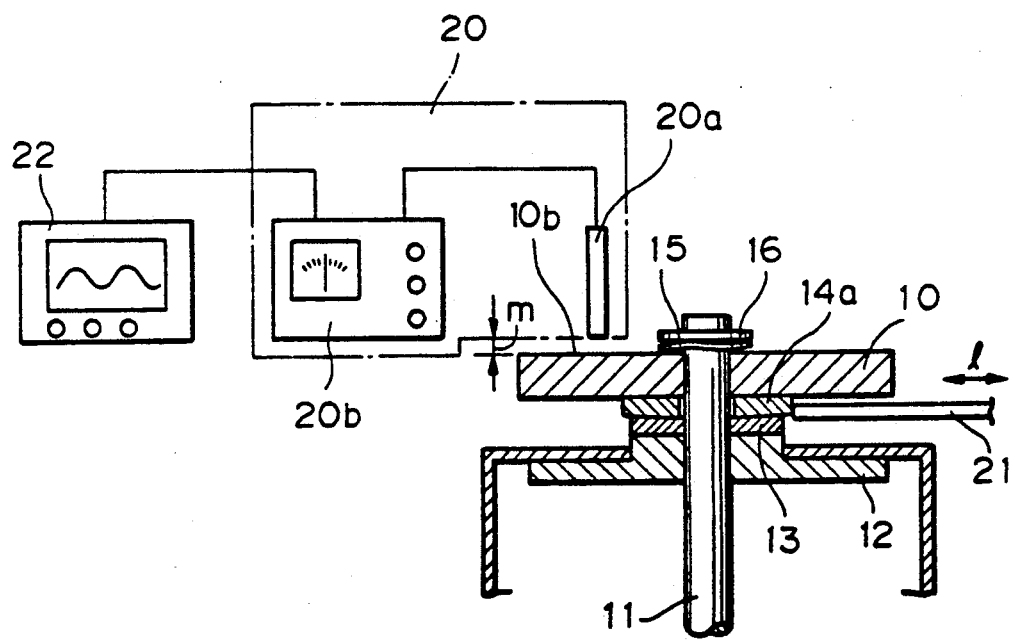
FIG. 9 illustrates a method of measuring and adjusting the inclination of a polygon mirror.

A method of measuring and adjusting a gap m which utilizes an electrostatic microsensor is shown in FIG. 9. In FIG. 9, the reference numeral 10 designates a polygon mirror, the reference numeral 20 denotes a microsensor, the reference character 20a designates a sensor probe, the reference character 20b denotes a controller with an indicator, the reference numeral 22 designates an oscilloscope, and the reference numeral 21 denotes a fine feed mechanism. The electrostatic microsensor is a non-contact type measuring machine utilizing the fact that the amount of variation in the gap m between the sensor probe 20a and an object to be measured, i.e., the upper surface 10b of the polygon mirror 10, is linearly proportional to the amount of variation in the electrostatic capacity. As previously described, the spherical seat 14 is pushed by the fine feed mechanism 21, whereby the gap m can be varied, and the amount of push l can be simply found by calculating the gap m. Accordingly, if the adjustment of pushing the spherical seat 14 by the fine feed mechanism 21 is suitably made so that the amount of variation in the gap m when the polygon mirror is rotated about the rotary shaft becomes minimum while the amount of variation in the gap m is monitored, the inclination of the polygon mirror relative to the rotary shaft can be easily minimized.

Since the electrostatic microsensor is a noncontact, type measuring machine and is high in response frequency, the amount of variation in the gap m when the polygon mirror is rotated at a high speed can also be monitored by the oscilloscope 22. While the electrostatic microsensor 20 has been used to measure the gap m, an optical fiber sensor utilizing the reflected light from the upper surface 10b of the polygon mirror to optically measure the gap m may be used instead of the electrostatic microsensor.

Now, assuming that measurement is thus effected, for example, at the position of the radius $\gamma$ from the center of the rotary shaft 11 and that the amount of variation in the upper surface 10b when the polygon mirror is inclined by $\theta$ is m, $$m = (\tan\theta) \times \gamma \qquad (2)$$

in the range of $m \ll < \gamma$, and if, for example, $\gamma = 15$ mm and the inclination $\theta$ of the polygon mirror is $\theta = 15''$, $m = 1.09$ μm from equation (2).

Both of $l = 7.27$ μm found from equation (1) and $m = 1.09$ μm found from equation (2) are the values when the polygon mirror 10 is inclined by $\theta = 15''$. Thus, it is seen that the amount of slide l is greater by seven times than the amount of variation found at the position of the radius $\gamma$.

That is, to finely adjust the inclination of the upper surface 10b, the amount of slide l can be sufficiently secured.

Figure 7:
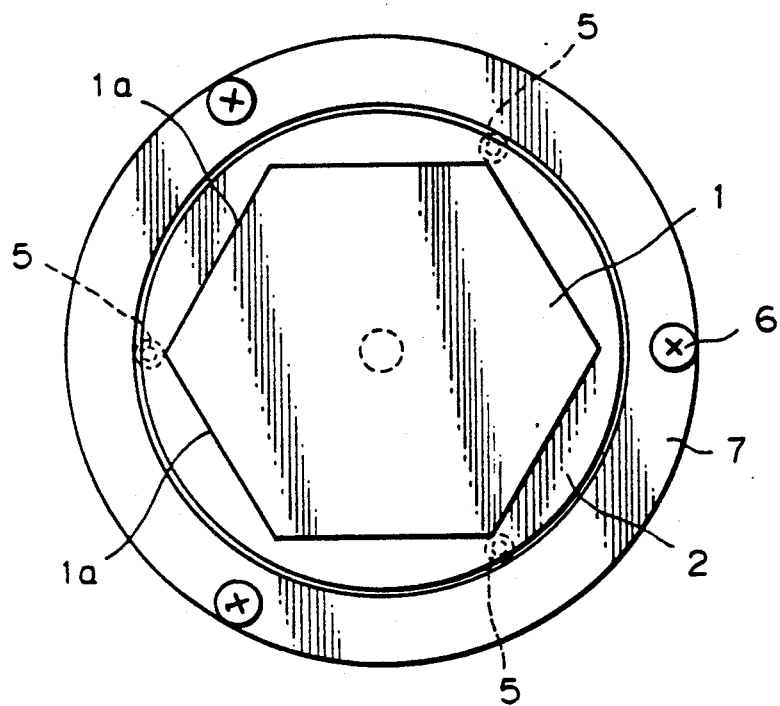
FIGS. 7 and 8 show an example of the prior art.
Figure 8:
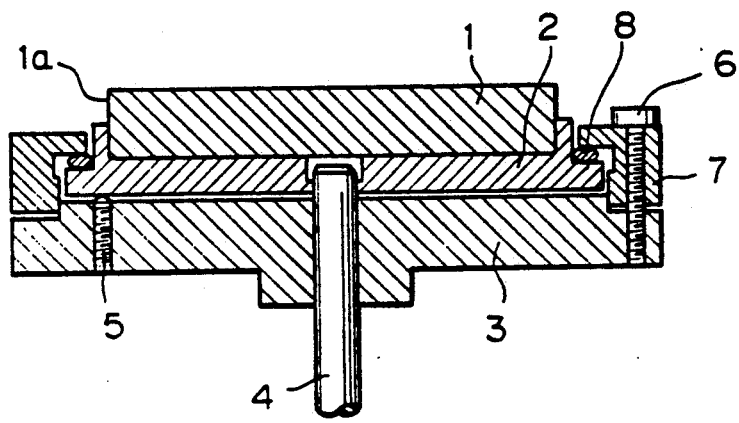

In the prior art shown in FIGS. 7 and 8, this amount of variation m is directly adjusted and therefore, fine adjustment cannot be accomplished. Further, in the prior art, a fine feed mechanism used within the scanning device provided with adjustment screws 5 shown in FIG. 8 cannot be used in place of the adjustment screws 5, and only screws of normal screw pitch can be used as the adjustment screws 5. Whereas in the present invention, adjustment of the amount of slide l can be extraneously accomplished in the direction of arrow 17 by a jig incorporating the fine feed mechanism used in a micrometer and therefore, the inclination of the polygon mirror 10 can be precisely adjusted.

The polygon mirror 10 is fitted to the rotary shaft 11 so that the polygon mirror 10 does not move radially of the rotary shaft 11 even when the spherical seat 14 is eccentrically shifted by the amount of slide 1.

In the prior art shown in FIGS. 7 and 8, there are only three adjustment screws 5 and therefore, how to make adjustment on the basis of the result obtained by measuring at the position of the radius $\gamma$ is unclear.

In contrast, in the method according to the present invention, if the points of maximum inclination are successively adjusted by the use of the relations of equations (1) and (2), adjustment can be simply accomplished and the amount of adjustment can also be easily calculated. This is because the use of the spherical seat enables adjustment to be made from any position within 360°.

While in the above-described embodiment, a polygon mirror has been, shown as the rotatable optical member, other optical elements such as a prism, a lens or the like may of course be employed.

Also, a support member may be set instead of, the polygon mirror, and a mirror may be supported on the support member axially of the rotary shaft 11 and may be rotated about the rotary shaft 11, and also may be rotated clockwise or counter-clockwise as a galvano mirror.

Embodiment 2

Figure 3:
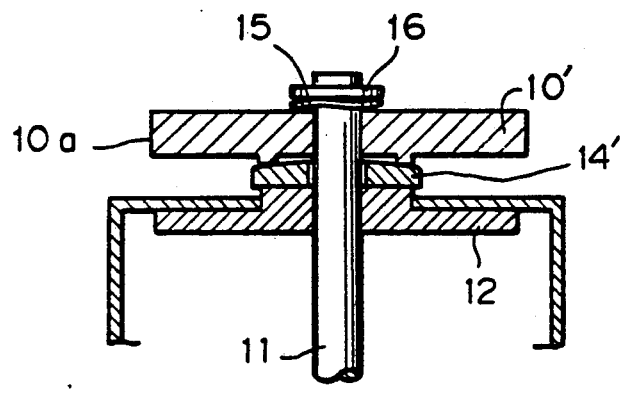
FIGS. 3 to 6 show modifications.

FIG. 3 shows a second embodiment of the present invention in which the mounting seat 13 in FIG. 1 is eliminated and instead a ring-like projection is added to the polygon mirror 10' and a convex seat is employed as the spherical seat 14' for adjustment.

Embodiment 3

Figure 4:
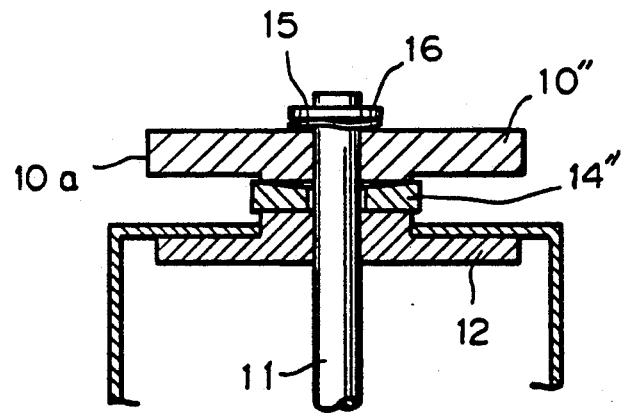

FIG. 4 shows a third embodiment of the present invention in which the spherical seat 13 in FIG. 1 is eliminated and instead, a boss-like projection is provided on the polygon mirror 10" and a concave seat is employed as the spherical seat 14" for adjustment.

Embodiment 4

Figure 5:
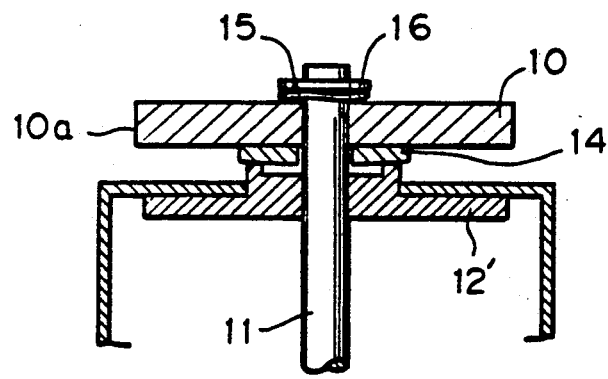

FIG. 5 shows a fourth embodiment of the present invention in which the spherical seat 13 in FIG. 1 is eliminated and instead, a ring-like projection is added to the mounting seat 12' and a convex seat is employed as the spherical seat 14 for adjustment.

Embodiment 5

Figure 6:
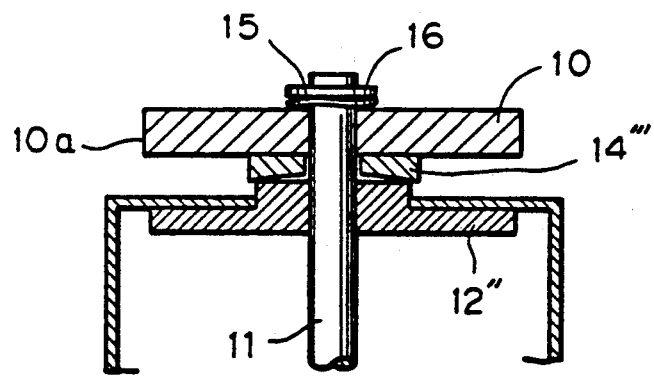

FIG. 6 shows a fifth embodiment of the present invention in which the mounting seat 13 in FIG. 1 is eliminated and instead, the boss portion of the mounting seat 12" is utilized and a concave seat is employed as the spherical seat 14''' for adjustment.

We claim:

1. Method for mounting and adjusting a rotatable optical element to a rotation shaft having a rotation axis, comprising the steps of:
   mounting an optical element to the rotation shaft with a spherical seat and a holding member, with the spherical seat being supported slidably in a direction perpendicular to the rotation axis;
   detecting an inclination of the optical element with respect to the rotation shaft; and
   shifting the spherical seat by pressing a peripheral portion thereof in a direction corresponding to the detected inclination to adjust a mounting alignment of the optical element.

2. Method for mounting and adjusting a rotatable optical element to a rotation shaft according to claim 1, wherein the optical element is a polygon mirror.

3. Method for mounting and adjusting a rotatable optical element to a rotation shaft according to claim 2, further comprising the step of rotating the optical element while the inclination is detected.

4. Method for mounting and adjusting a rotatable optical element to a rotation shaft according to claim 3, further comprising the step of measuring the degree of inclination of each mirror surface of the optical element to detect the inclination.

5. Method for mounting and adjusting a rotatable optical element to a rotation shaft according to claim 1, wherein the detecting and shifting steps are repeated.

6. Method for mounting and adjusting a rotatable optical element to a rotation shaft according to claim 1, further comprising the step of detecting a degree of inclination along with detecting the inclination of the optical element.

7. Method for mounting and adjusting a rotatable optical element to a rotation shaft according to claim 6, further comprising the step of shifting the spherical seat by an amount corresponding to the detected inclination degree.

8. Method for mounting and adjusting a rotatable optical element to a rotation shaft according to claim 1, further comprising the step of detecting the inclination of the optical element in a non-contact manner.

9. Method for mounting and adjusting a rotatable optical element to a rotation shaft according to claim 8, wherein the inclination of the optical element is detected by measuring a position of an upper surface of the optical element.

10. Method for mounting and adjusting a rotatable optical element to a rotation shaft according to claim 9, further comprising the step of detecting the inclination by a capacitance.

11. Method for mounting and adjusting a rotatable optical element to a rotation shaft according to claim 9, further comprising the step of optically detecting the inclination.

12. Method for mounting and adjusting a rotatable optical element to a rotation shaft having a rotation axis, comprising the steps of:
   mounting an optical element to the rotation shaft with a spherical seat and a holding member, with the spherical seat being supported slidably in a direction perpendicular to the rotation axis;
   detecting an inclination degree of the optical element relative to the rotation shaft; and
   shifting the spherical seat by pressing a peripheral portion thereof by a sliding amount corresponding to the detected inclination degree to adjust a mounting alignment of the optical element.

13. Method for mounting and adjusting a rotatable optical element to a rotation shaft according to claim 12, wherein the optical element is a polygon mirror.

14. Method for mounting and adjusting a rotatable optical element to a rotation shaft according to claim 13, further comprising the step of rotating the optical element while the inclination is detected.

15. Method for mounting and adjusting a rotatable optical element to a rotation shaft according to claim 14, further comprising the step of measuring the degree of inclination of each mirror surface of the optical element to detect the inclination.

16. Method for mounting and adjusting a rotatable optical element to a rotation shaft according to claim 12, wherein the detecting and shifting steps are repeated.

17. Method for mounting and adjusting a rotatable optical element to a rotation shaft according to claim 12, further comprising the step of detecting the inclination of the optical element in a non-contact manner.

18. Method for mounting and adjusting a rotatable optical element to a rotation shaft according to claim 17, wherein the inclination of the optical element is detected by measuring a position of an upper surface of the optical element.

19. Method for mounting and adjusting a rotatable optical element to a rotation shaft according to claim 17, further comprising the step of detecting the inclination by a capacitance.

20. Method for mounting and adjusting a rotatable optical element to a rotation shaft according to claim 17, further comprising the step of optically detecting the inclination.

21. An apparatus for mounting and adjusting a rotatable optical element to a rotation shaft, comprising:
an optical element to be fitted to the rotation shaft, said optical element being mounted to said rotation shaft by a spherical seat and a holding member;
detection means for detecting an inclination of said optical element with respect to said rotation shaft; and
pressing means for shifting said spherical seat by slightly pressing a peripheral portion thereof by a sliding amount corresponding to a detected inclination degree to adjust a mounting alignment of said optical element.

22. An apparatus according to claim 21, wherein said optical element is a polygon mirror.

23. An apparatus according to claim 21, wherein said detection means includes a non-contact type measuring means for detecting the inclination of said optical element in a non-contact manner.

24. An apparatus according to claim 23, wherein said detection means detects the inclination by said measuring means while said optical element is being rotated.

25. An apparatus according to claim 24, wherein said detection means includes an output means for indicating a detected value varying with the rotation in a form of a wave.

26. An apparatus according to claim 23, wherein said measuring means includes a micro-sensor capable of measuring a distance between the sensor and an upper surface of said optical element by a capacitance.

27. An apparatus according to claim 23, wherein said measuring means includes an optical fiber sensor for detecting a distance between said micro-sensor and an upper surface of said optical element by a reflection light beam projected to the upper surface of said optical element from said optical fiber.

28. An apparatus according to claim 21, wherein said pressing means includes a jib means having subtle feeding mechanism used in a micro-meter.

* * * * *

UNITED STATES PATENT AND TRADEMARK OFFICE
CERTIFICATE OF CORRECTION

PATENT NO. : 5,113,280
DATED : May 12, 1992
INVENTOR(S) : Keiichi Kawasaki, et al.

It is certified that error appears in the above-identified patent and that said Letters Patent is hereby corrected as shown below: On the title page, Item

[60] RELATED U.S. APPLICATION DATA:

"1982," should read --1987,--.

COLUMN 3:

Line 57, "is (" should read --is $\ell$--.

COLUMN 4:

Line 28, "noncontact," should read --non-contact--.

COLUMN 5:

Line 20, "been," should read --been--.
Line 23, "of," should read --of--.

UNITED STATES PATENT AND TRADEMARK OFFICE
CERTIFICATE OF CORRECTION

PATENT NO. : 5,113,280
DATED : May 12, 1992
INVENTOR(S) : Keiichi Kawasaki, et al.

It is certified that error appears in the above-identified patent and that said Letters Patent is hereby corrected as shown below:

<u>COLUMN 8</u>:

Line 30, "jib" should read --jig--.

Signed and Sealed this

Twenty-fourth Day of August, 1993

Attest:

BRUCE LEHMAN

Attesting Officer    Commissioner of Patents and Trademarks